United States Patent [19]

Downey

[11] Patent Number: 5,547,600
[45] Date of Patent: Aug. 20, 1996

[54] ABSORPTION REFRIGERATION SYSTEM WORKING FLUID WITH MOLYBDATE, BORATE, SILICATE INHIBITOR BLEND

[75] Inventor: Sandra J. Downey, Cazenovia, N.Y.

[73] Assignee: Carrier Corporation, Syracuse, N.Y.

[21] Appl. No.: 435,930

[22] Filed: May 5, 1995

[51] Int. Cl.$^6$ .................. C09K 5/04; F25B 15/00
[52] U.S. Cl. .................. 252/68; 252/69; 62/112
[58] Field of Search .................. 252/69, 67, 68; 62/112

[56] References Cited

U.S. PATENT DOCUMENTS

| | | | |
|---|---|---|---|
| 2,582,306 | 1/1952 | Zellhoefer et al. | 252/68 |
| 2,755,170 | 7/1956 | Stubblefield et al. | 23/89 |
| 3,218,259 | 11/1965 | Verdieck et al. | 252/68 |
| 3,609,086 | 10/1971 | Modahl | 252/68 |
| 4,019,992 | 4/1977 | Krueger | 252/68 |
| 4,470,272 | 9/1984 | Itoh et al. | 62/474 |
| 5,186,010 | 2/1993 | Wehr | 62/112 |

FOREIGN PATENT DOCUMENTS

| | | |
|---|---|---|
| 59-93778 | 5/1984 | Japan . |
| 60-118785 | 6/1985 | Japan . |
| 2-85655 | 3/1990 | Japan . |
| 2-101352 | 4/1990 | Japan . |
| 2-147689 | 6/1990 | Japan . |
| 991578 | 5/1965 | United Kingdom . |

*Primary Examiner*—Christine Skane

[57] ABSTRACT

A corrosion inhibiting working fluid for absorption refrigeration systems and a method of manufacturing such a fluid. The fluid is an aqueous solution of a halogen salt of lithium or ammonia to which are added water soluble compounds containing molybdates, borates and, in a preferred embodiment, silicates. Preferred concentrations of the resultant molybdenum, boron and silicon ions are disclosed. A water soluble compound containing a hydroxide is also added to produce an alkaline normality. In a preferred method of manufacture, the additive compounds are added to the working fluid as aqueous solutions.

6 Claims, No Drawings

5,547,600

ABSORPTION REFRIGERATION SYSTEM WORKING FLUID WITH MOLYBDATE, BORATE, SILICATE INHIBITOR BLEND

BACKGROUND OF THE INVENTION

This invention relates generally to absorption refrigeration systems. More particularly the invention relates to corrosion inhibiting working fluids for use in such systems and to a method of manufacturing such fluids. The fluids have corrosion inhibitors that reduce the corrosion of metals in the system that are in contact with the system working fluid.

There are a number of different pairs of refrigerants and absorbents that are used in absorption refrigeration systems. One such pair is water and a halogen salt of lithium, such as lithium bromide, lithium chloride or lithium iodide, mixed to form a concentrated aqueous solution of the lithium salt. Another such pair is water and ammonia.

Iron and iron alloys like steel and copper and copper alloys are typical construction materials used in absorption refrigeration systems. Corrosion of these materials can cause difficulties. Not only is metal loss of concern but also the oxidation of ferrous metal produces gaseous hydrogen. If not purged, the hydrogen can interfere with the proper operation of the system. Corrosion is of particular concern in systems that use halogen salts of lithium. And regardless of the refrigerant/absorbent pair used in a particular system, metal corrosion rates increase as system temperatures increase.

It is well known in the prior art that the addition of a salt of chromium, such as lithium chromate, to the refrigerant/absorbent solution in an absorption refrigeration system, is effective in reducing metallic corrosion. The presence of the chromate compound promotes the formation of a protective layer of iron and chromium oxides on the surfaces of the system that are in contact with the absorbent. With a reduction in iron oxidation, there is also a corresponding reduction in the production of noncondensible hydrogen. There is some concern, however, about the health risks that chromium presents. At least one government authority, the U.S. Environmental Protection Agency, has identified chromium as a carcinogen, and has prohibited the presence of chromium compounds in systems that are open to the atmosphere. As of this writing, there is no restriction on the use of chromium compounds in closed systems but there may be such a restriction in the near future. Absorption refrigeration systems are, of course, closed systems, but a certain amount of working fluid from the system can become exposed to the atmosphere through the taking of samples, the manufacturing process and spills during handling and filling. And, at the end of the service life of a system, the system charge will necessarily require disposal of the working fluid, including the chromium compounds that it contains.

What is needed are working fluids for absorption refrigeration system that have an inhibitor that is effective in reducing the corrosion of metallic components of the system and that is free of the environmental and health drawbacks of inhibitors that contain compounds of chromium. The fluids should be adaptable to a variety of different system types and be effective at inhibiting corrosion even at the very high temperatures experienced in triple effect absorption systems and in systems fired by natural gas or propane.

SUMMARY OF THE INVENTION

The present invention is a chromium-free aqueous solution of either a halogen salt of lithium or ammonia for use as a working fluid in a absorption refrigeration system. In addition to the lithium salt or ammonia, the solution also contains a compound containing a molybdate, a compound containing a borate and, in a preferred embodiment, a compound containing a silicate, so that ions of molybdenum, boron and silicon are present in the working fluid. A sufficient quantity of a compound containing a hydroxide is added to the solution to render it rather strongly basic. The added constituents act as effective corrosion inhibitors. The inhibiting performance of the fluids is superior to that of prior art lithium chromate inhibitors.

A working fluid is prepared by adding halogen or ammonium salts of molybdenum, boron and, in a preferred embodiment, silicon to the aqueous solution of the lithium salt or ammonia. A hydroxide of sodium, lithium, potassium or ammonium is also added to attain the desired alkalinity. The added compounds preferably should be added as aqueous solutions.

The corrosion inhibiting performance of one embodiment of the fluid of the present invention has been tested both under laboratory conditions using samples of steel and copper and in an operating refrigeration system. The test results indicate that the fluid provides corrosion resistance that is superior to a chromate inhibitor as well as other inhibitors and inhibitor blends.

DESCRIPTION OF THE PREFERRED EMBODIMENTS

The working fluid of the present invention is an aqueous solution of a halogen salt or ammonia. In addition, the fluid contains a corrosion inhibiting blend of molybdenum and boron ions. In one embodiment, the blend also contains silicon ions. A compound containing hydroxide is also added to the fluid to add hydroxyl ions and bring the solution to an alkaline normality. The presence of the molybdenum, boron and silicon ions is achieved by the addition of compounds containing, respectively, molybdate, borate and silicate.

A particular absorption refrigeration system will commonly have as a working fluid an aqueous solution of lithium bromide, lithium chloride, lithium iodide or ammonia. A system may also have a working fluid that is an aqueous solution of two or more of the halogen salts of lithium. It is preferable for the corrosion inhibiting compounds containing molybdate, borate and silicates be like salts to the fundamental constituents of the fluid. Thus, in a water and lithium bromide working fluid, the additive compounds preferably should be lithium molybdate, lithium borate and lithium silicate. And the normality preferably should be adjusted by addition of lithium hydroxide. In a water and ammonia working fluid, the additive compounds preferably should be ammonium, lithium or sodium molybdate, ammonium, lithium or sodium borate and ammonium, lithium or sodium silicate, with the normality preferably adjusted by the addition of ammonium, lithium or sodium hydroxide. Addition of potassium molybdate, borate and silicate with normality adjustments using potassium hydroxide will, however, also give satisfactory results.

The working fluid of the present invention may be prepared by mixing and dissolving techniques. For example, one may prepare a corrosion inhibiting lithium bromide working fluid by preparing an aqueous solution of lithium bromide. Then, lithium molybdate, lithium borate and, in a preferred embodiment, lithium silicate and lithium hydroxide are added. It is preferable to add the additive compounds to the refrigerant/absorbent solution themselves as aqueous solutions rather than attempting to directly dissolve the compounds in the refrigerant/absorbent solution directly.

I have tested lithium bromide working fluids made according to the teaching of the present invention under both laboratory conditions and in an operating refrigeration system. The base aqueous solution of lithium bromide in one such fluid was 55 weight percent lithium bromide and it was 0.06 N. The concentration of the other additives were 150 parts per million (ppm, by weight) molybdenum, 190 ppm boron and 10 ppm silicon. I have also tested fluids with similar characteristics but without the addition of a silicon compound.

The results of my tests indicate that working fluids made according to the present invention, both with and without silicon, provide superior corrosion inhibition when compared to working fluids containing chromium. The actual corrosion rates vary with temperature conditions, type of metal and whether the metal is exposed to fluid in the vapor phase, liquid phase or both liquid and vapor phases. On average, however, the corrosion rate, for both copper and steel, using a working fluid made according to the teaching of the present invention was on the order of one hundred times less than for a working fluid having no corrosion inhibitors and on the order of ten times less than for a working fluid containing a chromium inhibitor. The addition of a silicon containing compound provided marginally superior performance when compared to a fluid having an inhibitor blend that did not contain the silicon.

From my data, I believe that comparable test results would be obtained with a working fluid having a normality of from 0.03 to 0.2, molybdenum concentrations in the range of 120 to 180 ppm, boron concentrations in the range of 160 to 220 ppm and silicon concentrations in the range of 1 to 20 ppm. Furthermore, relatively small concentrations of inhibitor additives, from about 10 ppm of molybdenum and 1 ppm of boron, should be effective in reducing corrosion.

Tests indicate that the corrosion inhibiting ability of the working fluid of the present invention is not effected by the addition of other additives such as 2 ethyl hexanol. The working fluid of the present invention may become slightly turbid after storage for an extended period. Turbidity has no effect on its corrosion inhibiting properties. The working fluid of the present invention also prevented the plating of copper on steel components in the system under test. It is important that there be no calcium impurities (maximum 1 ppm) in the fluid.

Some of the constituents of the inhibitor blend will be consumed over time when the working fluid is charged into a system, with the consumption rate increasing when the system is in operation. Therefore it is desirable to make the concentrations of the constituent compounds somewhat more than is necessary as an allowance for consumption. This consumption allowance may dictate molybdenum concentrations as high as 500 ppm, boron concentrations as high as 1 percent (10,000 ppm) and silicon concentrations as high as 100 ppm.

Note that the above concentrations of additives are stated in terms of a working fluid having a normal concentration of a halogen salt or salts or ammonium, for example, a 54 to 56 weight percent aqueous solution of lithium bromide and a ten weight percent aqueous solution of ammonia.

I claim:

1. A working fluid for absorption refrigeration systems comprising an aqueous solution of at least one compound selected from the group consisting of
lithium bromide,
lithium chloride and
lithium iodide, said solution also containing;
a molybdate in a sufficient quantity to insure that said solution has a molybdenum concentration of about 10 to 500 ppm,
a borate in a sufficient quantity to insure that said solution has a boron concentration of about 1 to 10,000 ppm, and
a silicate in a sufficient quantity to insure that said solution has a silicon concentration of about 1–20 ppm.

2. The working fluid of claim 1 which further contains a sufficient amount of hydroxide to produce an alkaline normality.

3. The working fluid of claim 2 in which said solution has a normality of 0.03 to 0.2.

4. A working fluid for absorption refrigeration systems comprising an aqueous solution of at least one compound selected from the group consisting of
lithium bromide,
lithium chloride and
lithium iodide, said solution also containing;
a molybdate in a sufficient quantity to insure that said solution has a molybdenum concentration of about 120 to 180 ppm,
a borate in a sufficient quantity to insure that said solution has a boron concentration of about 160 to 220 ppm, and
a silicate in a sufficient quantity to insure that said solution has a silicon concentration of about 1–20 ppm.

5. The working fluid of claim 4 which further contains a sufficient amount of hydroxide to produce an alkaline normality.

6. The working fluid of claim 5 in which said solution has a normality of 0.03 to 0.2.

* * * * *